Sept. 14, 1937.  R. M. DAVENPORT  2,093,125
HIGH LIFT RIPPER
Filed June 15, 1935  2 Sheets-Sheet 1

INVENTOR
RALPH M. DAVENPORT
BY
James M. Abbett
ATTORNEY

Sept. 14, 1937.   R. M. DAVENPORT   2,093,125
HIGH LIFT RIPPER
Filed June 15, 1935   2 Sheets-Sheet 2
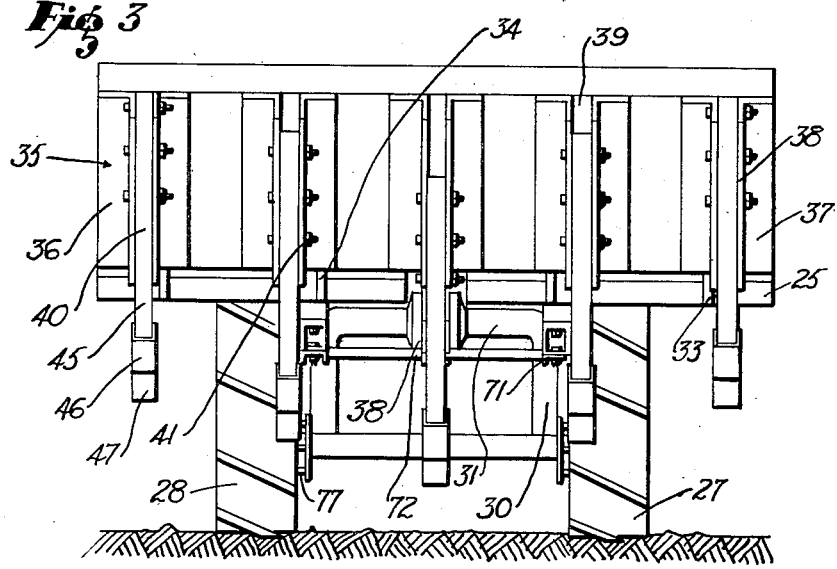
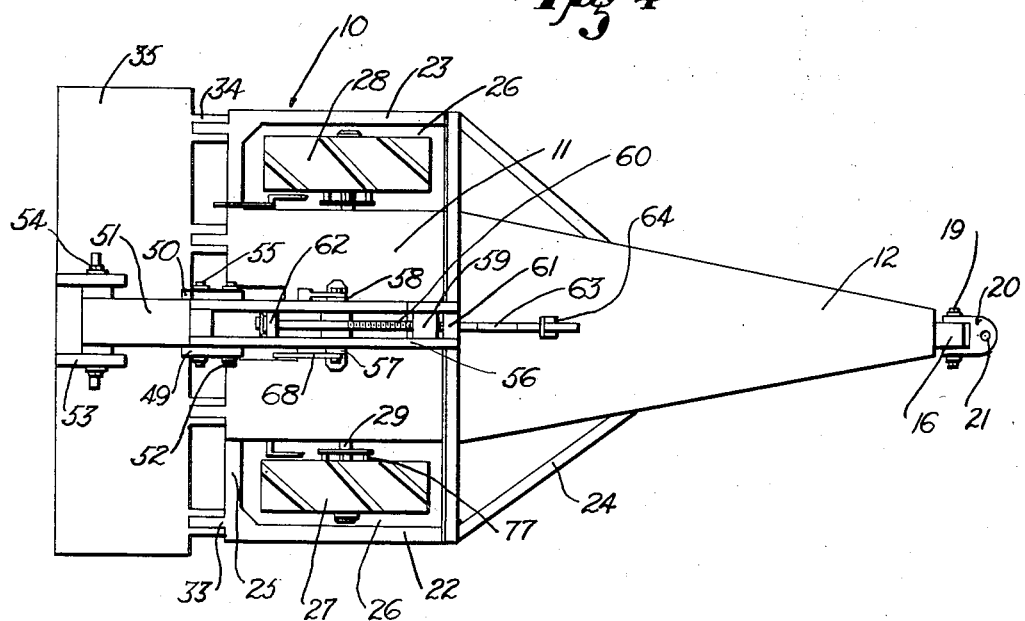
INVENTOR
RALPH M. DAVENPORT
BY James M. Abbett
ATTORNEY Patented Sept. 14, 1937

2,093,125

UNITED STATES PATENT OFFICE 2,093,125

HIGH LIFT RIPPER

Ralph M. Davenport, Los Angeles, Calif.

Application June 15, 1935, Serial No. 26,816

9 Claims. (Cl. 97—73)

This invention relates to dirt working machinery and particularly pertains to a high lift earth ripper.

In preparing the soil for various agricultural and engineering operations, and in connection with the construction and removal of pavements and roadways, and the like, it is usual to provide some means whereby the soil or pavements may be broken and otherwise distintegrated readily to insure their subsequent removal or reworking. These operations are usually accomplished by a dirt working machine known as a ripper, which generally comprises a plurality of digging teeth caused to penetrate the ground to a desired depth, after which the implement carrying the teeth is drawn forwardly by power, such for example as a tractor, and the ripping operation is thus performed. In connection with these structures it is necessary at times to retract the ripping teeth from the soil for further operations, and in some instances to remove the debris which has collected upon and between the teeth. It is the principal object of the present invention therefore to provide a ripping implement which is designed to penetrate the soil and the like to a desired adjustable depth, and which implement is equipped with operating mechanism whereby the movement of the ripping teeth to and from their soil penetrating positions may be brought about in a simple and effective manner incident to the advanced movement of the implement, the structure having the additional distinctive feature of automatically lifting the scarifying teeth a considerable distance above the ground so that they will be clear of the soil and vegetation thereon, and so that they will be substantially self-cleaning.

The present invention contemplates the provision of a dirt working implement comprising a main frame, a running gear therefor, a supplemental frame articulately connected therewith carrying a set of scarifying teeth, the two frame sections being connected by mechanism by which the supplemental frame and the scarifying teeth may be readily raised or lowered at the will of the operator.

The invention is illustrated by way of example in the accompanying drawings in which:

Fig. 3 is a view in end elevation showing the axle arrangement and the supplemental frame carrying the scarifying teeth.

Fig. 4 is a view in plan showing the complete structural arrangement of the device.

Figure 1:
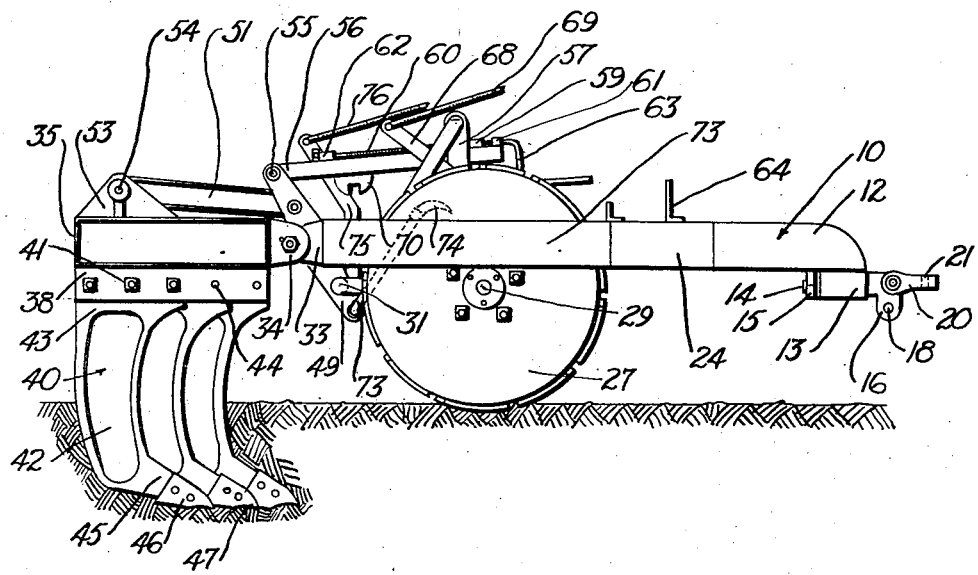
Figure 1 is a view in side elevation showing the structure of the present invention with parts broken away and in its digging position.

Referring more particularly to the drawings 10 indicates a frame structure having a longitudinally extending center beam 11 terminating at its forward end in a tongue 12. A longitudinally extending bearing 13 is secured to the tongue and beneath its end face. Extending through the bearing 13 is a swivel bolt 14, the rear end of which is threaded to receive a nut 15. The forward end of the swivel bolt is formed with an L-shaped head 16 having an upper opening 17 and a lower opening 18 into one of which a shackle bolt 19 may be positioned. This bolt passes through the ears of a draw bar shackle 20, the forward end of which has a vertical opening 21 therethrough to receive the pin of a draw bar not shown, and by which the structure may be connected with a suitable tractor. Extending parallel to the beam 11 and spaced therefrom are side frame elements 22 and 23 which adjacent their forward ends are bent inwardly as indicated at 24 to connect with the center beam 11 and to rigidly brace the entire frame structure. A transverse rear beam 25 connects the rear ends of the side members 22 and 23 and the center beam 11 to form a main frame. Spaces 26 occur between the side beams 22 and 23 and the center beam 11. These spaces are provided to accommodate ground wheels 27 and 28 which provide the running gear for the implement. These ground wheels are mounted to rotate upon an axle 29, the construction of which is best seen in Fig. 3 of the drawings. The ground wheels 27 and 28 and the axle 29 constitute the running gear. Here the axle is shown as being formed integral with a U-shaped frame element 30, the legs of which are securely attached to the axle adjacent the ground wheels 27 and 28, and has a transversely extending crank portion 31. The crank portion 31 is disposed parallel to the axle 29 and is housed within bearings 32 which are fastened to the transverse frame member 25 of the main frame. The transverse frame member 25 is formed with a plurality of brackets 33 which extend rearwardly therefrom and receive bracket lugs 34 disposed in spaced relation to each other throughout the length of an auxiliary frame member 35. The auxiliary frame member 35 is rectangular in shape being formed with frame sections bounding the structure, and a floor 36 which carries angle members 37, the parallel legs 38 of which are spaced from the frame as indicated at 39 to accommodate the scarifier teeth 40. These teeth members are bolted in the channel 39 by bolts 41. By reference to Fig. 1 of the drawings it will be seen that the scarifier teeth 40 have downwardly extending shanks 42 of I-beam section, the upper ends of said shanks being longitudinally elongated as indicated at 43 to provide a proper rigid mounting within the channels 39. Attention is directed to the fact that there are a plurality of bolt holes 44 which makes it possible to mount the different scarifier teeth 40 in various longitudinally disposed positions relative to the frame 35. The lower ends of the scarifier teeth terminate in forwardly extending feet 45 which project forwardly and receive blade shoes 46, the terminating ends of which are sharpened to provide blades 47. The blades are held in position by bolts 48, which pass through the portion of the shoes 46 telescoped over the ends of the feet 45.

Pivotally mounted upon the transverse crank 31 of the axle is a pair of upright levers 49 and 50 between which a link 51 is pivotally secured upon a pin 52. The link extends rearwardly and is pivoted between upwardly extending bracket arms 53 fixed to the top of the auxiliary frame section 35. A suitable pivot bolt 54 holds the rear end of the link 51 in pivotal relation to the brackets 53. Upper extensions of the levers 49 and 50 receive a pivot pin 55 to which a lock bar 56 is fastened. This lock bar projects between a pair of standards 57 and 58 which are secured to the upper face of the center beam 11 of the main frame. The lock bar 56 is formed of parallel bar elements between which a space occurs. A forward lock fitting 59 is disposed to slide longitudinally between the elements of the lock bar 56 and is mounted upon an adjusting screw 60. This screw 60 is rotatably supported on the bar at its forward end in a bearing 61 and at its rear end in a bearing 62. A crank 63 is formed as a continuation of the forward end of the screw and may be held in a set position by a clip 64. The lock fitting 59 has a lower fork shaped yoke 65 which may rest over a curved outer face of a lock cam 66. The lock cam 66 is mounted upon a pivot 67 carried by the standards 57 and 58 and disposed beneath the lock bar 56. A lever 68 is fastened to the end of the shaft 67 and may be operated from the tractor by a cable 69. A lock yoke 70 is secured upon the end face of the lock bar 56 and may be brought to engage the cam 66 when the bar 56 is moved to its forward position. Carried by the bearing 32 for the axle crank 31 is an auxiliary bearing structure 71 to receive a shaft 72. The opposite ends of the shaft 72 extend upwardly in arms 73 and at the ends of these arms hooks 74 are fastened. Fastened to the shaft 72 is an upwardly extending lever 75 which receives an operating cable 76 leading to the tractor and by which the arms 73 with their hook ends 74 may be swung downwardly into engagement with one of a plurality of driving pins 77 which are fixed to the inner faces of each of the wheels 27 and 28, and which when engaged by the hooks 74 of the arms 73 will cause the crank shaft 31 of the axle to swing and will in turn lift the auxiliary frame structure 35. This same motion while causing the crank shaft 31 to swing upwardly will lift the entire main frame 10. The hook ends 74 of the arms 73 will ride out of engagement with the pins 77 as the implement advances and when the yoke block 70 has moved to a registering and locking position with the cam 66.

Figure 2:
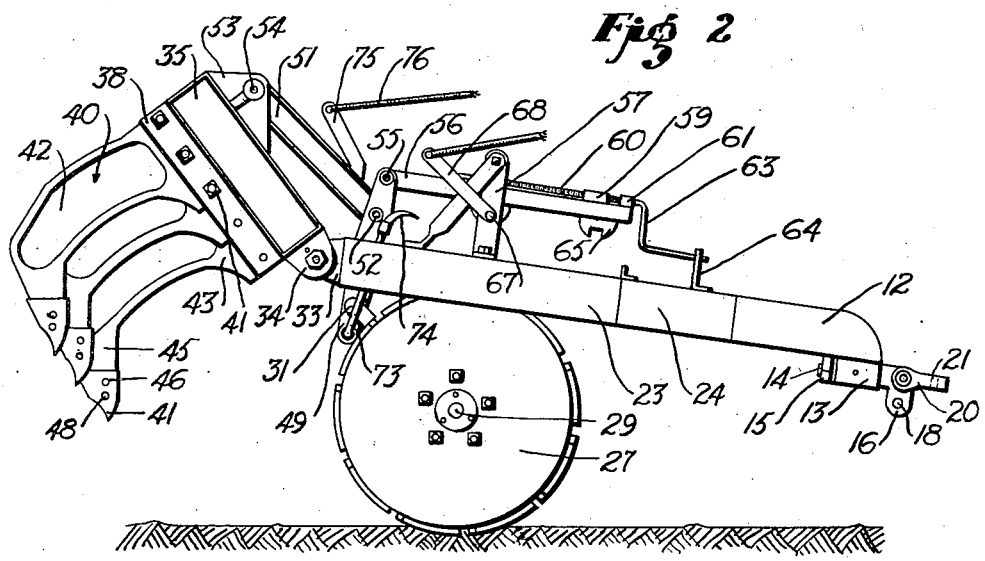
Fig. 2 is a view in side elevation showing the present invention with the scarifying teeth in their clearance position.

In operation of the present invention the structure is assembled as here shown. A suitable draw bar connection between the implement and a tractor is made by a shackle 20 after which the auxiliary frame 35 is moved to its lifted position with relation to the main frame 10. In this position it is locked by engagement of the yoke block 70 with the cam 66. This will hold the lock bar 56 in its foremost position with the levers 49 and 50 swung forwardly and the crank portion 31 of the rear axle 29 held in its uppermost position as shown in Fig. 2 of the drawings. The amount of penetration of the scarifying teeth 40 is adjustably determined by rotation of the crank 63 which will move the yoke block 59 longitudinally of the lock bar 56 to any desired point. After the adjustment has been made the crank 63 may be locked by the member 64. When it is desired to lower the auxiliary frame 35 with its scarifying teeth 40 this may be done by pulling on cable 69. This in turn swings the lever 68 forwardly and causes the cam 66 to lift the yoke block 70 out of engagement with it. The auxiliary frame and its scarifying teeth will fall until they strike the ground and assume the predetermined degree of penetration as controlled by the adjustment of yoke block 59. The yoke block 59 will at this time swing the cam 66 so that the cam and the block will come into blocking engagement with each other. The implement may then be drawn forwardly. When it is desired to lift the scarifying teeth 40 and to retract them from the soil the operator pulls on cable 76. This will swing the lever 75 forwardly and will swing the arms 73 carrying hooks 74 forwardly and downwardly until they encounter the pins 77 carried by the wheels 27 and 28. The hooks 74 will thus come into locking engagement with a set of these pins and thereafter as the wheels 27 and 28 rotate in an advanced direction the crank portion 31 of the axle 29 will swing forwardly and upwardly. This will simultaneously move the levers 49 and 50 forwardly and upwardly so that a thrust will be imposed upon the lock bar 56 and simultaneously a pull will be imposed upon the link 51. The auxiliary frame 35 will thus swing upon its pivot shaft 33' which extends through lugs 33 and 34. As the lock bar 56 moves forwardly the yoke block 59 will move out of engagement with the cam 66 and the yoke block 70 will move into engagement with it. This will hold the lock bar 56 in its advanced position, after which the hooks 74 of the arms 73 will be lifted out of engagement with the particular pin 77 around which they are hooked by the lifting action of the next succeeding pin 77.

Attention is directed to the fact that the present invention embodies a structure by which the main frame may be lifted bodily with relation to its axle, giving the maximum lifting clearance and that in addition thereto the scarifying teeth 40 will be lifted upwardly and rearwardly as the auxiliary frame 35 swings. This will insure that a maximum clearance will be obtained for the main frame, as well as the teeth, and that the lifting action may be brought about automatically at the control of the operator of the tractor. Attention is further directed to the fact that the device provides simple means for quickly adjusting the penetration, and also making it possible to instantly release the scarifying teeth and their frame when an immovable object is engaged by the teeth, and whereby further advance of the implement will cause the teeth to move upwardly and away from the obstruction in a manner to clear the same, and also to clean the teeth. By reference to Fig. 2 it will be seen that when in a lifted position the points of the teeth are disposed substantially vertical, so that dirt and debris accumulating upon them will readily fall away.

It will thus be seen that the dirt working implement here shown is decidedly rugged in the construction of its parts, is simple in design, and may be readily operated to perform the results required.

While I have shown the preferred form of my invention as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A scarifying implement comprising a running gear, a main frame mounted thereon for vertical lifting movement with relation thereto, an auxiliary frame pivoted at the rear of the main frame and adapted to rise therewith, a plurality of scarifying teeth carried by the auxiliary frame, means acting in conjunction with the running gear whereby the main frame will be lifted at its rear end and whereby the auxiliary frame will be lifted and swung upwardly and forwardly upon its pivotal connection with the main frame, lock means automatically acting to hold the running gear, the main frame, and the auxiliary frame in their lowermost position with relation to each other, or in their lifted position with relation to each other, and means adapted to be actuated by the wheels of the running gear as the implement advances to operate the main frame lifting means and the auxiliary frame swinging means.

2. A scarifying implement comprising a main frame having a draw bar connection at its forward end, a cranked axle upon which the rear end of the main frame is pivotally mounted, ground wheels carried at the ends of said axle, an auxiliary frame structure pivotally mounted along the rear edge of the main frame, scarifying teeth carried thereby, means operatively connected between the rear of the main frame and the ground wheels and optionally controlled to cause the axle crank to swing upwardly and forwardly as the ground wheels rotate in an advance movement, a lever carried by the crank portion of the axle, an operative connection between said lever and the auxiliary frame structure whereby the auxiliary frame structure will swing upwardly and forwardly as the cranked portion of the axle swings upwardly and forwardly, and lock means associated with said lever for locking the frames and the axle in a digging position and in a lifted position.

3. A scarifying implement comprising a main frame having a draw bar connection at its forward end, a cranked axle upon which the rear end of the main frame is pivotally mounted, ground wheels carried at the ends of said axle, an auxiliary frame structure pivotally mounted along the rear edge of the main frame, scarifying teeth carried thereby, means operatively connected between the rear of the main frame and the ground wheels and optionally controlled to cause the axle crank to swing upwardly and forwardly as the ground wheels rotate in an advance movement, a lever carried by the crank portion of the axle, an operative connection between said lever and the auxiliary frame structure whereby the auxiliary frame structure will swing upwardly and forwardly as the cranked portion of the axle swings upwardly and forwardly, lock means associated with said lever for locking the frames and the axle in a digging position and in a lifted position, and means controlled from a point remote to the implement to release the locking means in either of its positions.

4. A scarifying implement comprising a running gear including a pair of ground wheels and a cranked axle on which they are mounted, a frame pivotally mounted at its rear end to the cranked axle and provided with a draw bar connection at its forward end, means operatively connecting the crank of the axle with the running gear in a manner to insure that as the ground wheels rotate in an advance direction the axle crank will swing upwardly and forwardly and thereby lift the frame at its rear end, scarifying teeth carried by the frame and adapted to penetrate the soil when the frame is in its lowermost position, locking means associated with the frame and the crank of the axle whereby the scarifying teeth may be locked in their lifted or penetrating positions, and adjustable means associated therewith for determining the degree of penetration of the teeth.

5. A scarifying implement comprising a running gear including a pair of ground wheels and a cranked axle on which they are mounted, a frame pivotally mounted at its rear end to the cranked axle and provided with a draw bar connection at its forward end, means operatively connecting the crank of the axle with the running gear in a manner to insure that as the ground wheels rotate in an advance direction the axle crank will swing upwardly and forwardly and thereby lift the frame at its rear end, scarifying teeth carried by the frame and adapted to penetrate the soil when the frame is in its lowermost position, locking means associated with the frame and the crank of the axle whereby the scarifying teeth may be locked in their lifted or penetrating positions, adjustable means associated therewith for determining the degree of penetration of the teeth, and optionally controlled means for releasing the lock means.

6. A scarifying implement comprising a running gear including a pair of ground wheels and a cranked axle on which they are mounted, a frame pivotally mounted at its rear end to the cranked axle and provided with a draw bar connection at its forward end, means operatively connecting the crank of the axle with the running gear in a manner to insure that as the ground wheels rotate in an advance direction the axle crank will swing upwardly and forwardly and thereby lift the frame at its rear end, scarifying teeth carried by the frame and adapted to penetrate the soil when the frame is in its lowermost position, locking means associated with the frame and the crank of the axle whereby the scarifying teeth may be locked in their lifted or penetrating positions, adjustable means associated therewith for determining the degree of penetration of the teeth, optionally controlled means for releasing the lock means, and optionally controlled means for bringing the axle lifting means and the wheels of the running gear into engagement.

7. A scarifying implement comprising a running gear including a pair of ground wheels and a cranked axle on which they are mounted, a frame pivotally mounted at its rear end to the cranked axle and provided with a draw bar connection at its forward end, means operatively connecting the crank of the axle with the running gear in a manner to insure that as the ground wheels rotate in an advance direction the axle crank will swing upwardly and forwardly and thereby lift the frame at its rear end, scarifying teeth carried by the frame and adapted to penetrate the soil when the frame is in its lowermost position, locking means comprising a link fastened at its rear end to the rear of the scarifying teeth frame and at its forward end to a lever which is connected to the cranked axle and a lock bar fastened to the upper end of the lever said bar carrying a pair of yoke blocks whereby when the lock bar is operated the yoke blocks will move out of engagement with either one of a pair of cam members and the frame will swing upon its pivot to place it in an operative or inoperative position.

8. A scarifying implement comprising a running gear, a main frame mounted for vertical lifting movement with relation thereto, an auxiliary frame freely pivoted at the rear of the main frame and adapted to rise therewith, a plurality of scarifying teeth carried by the auxiliary frame, optionally controlled means in conjunction with the running gear whereby the main frame will be lifted at its rear end, and whereby the auxiliary frame will be lifted and swung upwardly and forwardly upon its pivotal connection with the main frame, lock means automatically acting to hold the running gear, the main frame, and the auxiliary frame, in their lowermost position with relation to each other, or in their lifted position with relation to each other, and means adapted to be actuated by the wheels of the running gear as the implement advances to operate the main frame lifting means and the auxiliary frame swinging means, and means for automatically releasing the lifting means at the conclusion of said lifting operation.

9. A scarifying implement comprising a main frame having a draw bar at the forward end, a running gear upon which the rear end of the main frame is pivotally mounted, ground wheels carried at the end of said axle, an auxiliary frame structure pivotally mounted along the rear end of the main frame, scarifying teeth carried thereby, means operatively connected to the rear of the main frame, the auxiliary frame, and the ground wheels, which is optionally controlled to cause the running gear to swing upwardly and forwardly as the ground wheels rotate in an advance movement whereby when said control means engages the ground wheels the rear of the main frame will be lifted upwardly while the auxiliary frame is lifted and swung upwardly and forwardly upon its pivotal connection with the main frame, lock means automatically acting to hold the running gear, the main frame, and the auxiliary frame, in their lowermost position with relation to each other, or in their lifted position with relation to each other.

RALPH M. DAVENPORT.